(12) United States Patent
Bhogal et al.

(10) Patent No.: US 8,959,482 B2
(45) Date of Patent: Feb. 17, 2015

(54) ENABLING MULTI-TENANCY FOR A COMMERCE SERVER

(75) Inventors: Navjot S. Bhogal, Bangalore (IN); Raghava Reddy Kapu Veera, Bangalore (IN); Ashish Mungi, Bangalore (IN); Ram Viswanathan, Plano, TX (US)

(73) Assignee: International Business Machines Corporation, Armonk, NY (US)

(*) Notice: Subject to any disclaimer, the term of this patent is extended or adjusted under 35 U.S.C. 154(b) by 224 days.

(21) Appl. No.: 13/590,572

(22) Filed: Aug. 21, 2012

(65) Prior Publication Data

US 2014/0059519 A1 Feb. 27, 2014

(51) Int. Cl.
*G06F 9/44* (2006.01)

(52) U.S. Cl.
USPC .......................................... 717/121; 717/120

(58) Field of Classification Search
None
See application file for complete search history.

(56) References Cited

U.S. PATENT DOCUMENTS

| | | | |
|---|---|---|---|
| 7,886,038 B2 | 2/2011 | Ferris | |
| 8,631,333 B2 * | 1/2014 | Cahill et al. | 715/751 |
| 8,732,200 B2 * | 5/2014 | Tootill | 707/781 |
| 2008/0270459 A1 * | 10/2008 | Grewal et al. | 707/103 R |
| 2009/0300423 A1 | 12/2009 | Ferris | |
| 2010/0005443 A1 | 1/2010 | Kwok et al. | |
| 2010/0023937 A1 | 1/2010 | Kothari et al. | |
| 2010/0077449 A1 | 3/2010 | Kwok et al. | |
| 2010/0125612 A1 | 5/2010 | Amradkar et al. | |
| 2010/0250608 A1 | 9/2010 | Malviya et al. | |
| 2011/0126168 A1 | 5/2011 | Ilyayev | |
| 2011/0131315 A1 | 6/2011 | Ferris et al. | |
| 2011/0154441 A1 | 6/2011 | Oh et al. | |
| 2011/0173294 A1 * | 7/2011 | Jackson | 709/217 |
| 2011/0258620 A1 | 10/2011 | Gao et al. | |
| 2011/0276584 A1 * | 11/2011 | Cotner et al. | 707/769 |
| 2012/0204126 A1 | 8/2012 | Yoshimura | |
| 2013/0198718 A1 * | 8/2013 | Kunze et al. | 717/121 |

(Continued)

FOREIGN PATENT DOCUMENTS

WO   2011050482   5/2011

OTHER PUBLICATIONS

Azeez et al. "Multi-Teant SOA middleware for Clouding Computing", 2010 IEEE 3rd International Conference on Cloud Computing, pp. 458-465.*

(Continued)

*Primary Examiner* — Don Wong
*Assistant Examiner* — Marina Lee
(74) *Attorney, Agent, or Firm* — Schmeiser, Olsen & Watts; John Pivnichny (57) ABSTRACT

A method and system for enabling multi-tenancy in a commerce server is provided. The method includes receiving software comprising an operating system, integrated development environment (IDE) software, commerce server middleware software, and database software. A virtual image instance of operating system, the IDE software, and the database software is provisioned to a virtual instance. User IDs for access to the operating system instance are generated. Workspaces are generated and associated with the user IDs. The commerce server middleware software is configured such that the user IDs, hosts, and ports are mapped to commerce server services associated with the commerce server middleware software. The database software is configured such that the virtual image instance is enabled to accept multiple concurrent logins associated with the user IDs.

11 Claims, 6 Drawing Sheets

(56) References Cited

U.S. PATENT DOCUMENTS

2013/0254764 A1* 9/2013 Bhogal et al. .................. 718/1
2014/0059519 A1* 2/2014 Bhogal et al. ................ 717/121

OTHER PUBLICATIONS

GeekInterview Question, published on Apr. 1, 2011, retrived from <http://www.geekinterview.com/question_details/84651> pp. 3.*

Nicole Henderson, Jun. 8, 2011, Web Host Global Net Access Launches Multi-Tenant GNAX Cloud, 2 pages, URL: http://www.the.thewhir.com/web-hosting-news060811 Web Host Global Net Access Launches Multi Tenant GNX Cloud.

Dionysios G. Synodinos, Cloud IDE for Java Launched by eXo, Mar. 17, 2011, 2 pages, URL: http://www.infog.com/news/2011/03/cloud-ide-java-exo.

Distinctive Cloud Technology Platform, 3 pages, URL: http://www.successfactors.com/cloud/architecture/.

VMware debuts Cloud Foundry, its open platform as a service, Apr. 14, 2011, Vision Solutions, 2 pages.

Sikander et al., A Prescriptive Architecture for Electronic Commerce and Digital Marketing, Microsoft, published Mar. 2010, Version 2.0, 95 pages.

Azeez et al., Multi-tenant SOA Middleware for Cloud Computing, Cloud Computing (CLOUD), 2010 IEEE 3rd International Conference, Jul. 5-10, 2010, pp. 458-465.

Office Action (Mail Date Oct. 22, 2014) for U.S. Appl. No. 13/428,442; Filing Date Mar. 23, 2012; Confirmation No. 8779.

* cited by examiner

ENABLING MULTI-TENANCY FOR A COMMERCE SERVER

FIELD

The present invention relates to a method and associated system for enabling multi-tenancy for a commerce server.

BACKGROUND

Managing multiple users of a system typically comprises an inaccurate process with little flexibility. Allowing multiple users to access data within a system may include a complicated process that may be time consuming and require a large amount of resources. Accordingly, there exists a need in the art to overcome at least some of the deficiencies and limitations described herein above.

SUMMARY

The present invention provides a method comprising: receiving, by a computing system comprising a computer processor, software comprising an operating system, integrated development environment (IDE) software, and database software; provisioning, by the computer processor, a virtual image instance of the operating system, the IDE software, and the database software to a virtual instance; generating, by the computer processor, a plurality of user IDs for access to the operating system instance, wherein each user ID of the plurality of user IDs is associated with a different user of a plurality of users; installing, by the computer processor, commerce server middleware software as a user specific setup; configuring, by the computer processor, the IDE software, wherein the configuring the IDE software comprises generating workspaces and user ID permissions for the installing; associating, by the computer processor, the workspaces with the user IDs; configuring, by the computer processor, the commerce server middleware software, wherein the configuring the middleware software comprises mapping the user IDs, hosts, and ports to commerce server services associated with the commerce server middleware software; configuring, by the computer processor, the database software, wherein the configuring the database software comprises generating virtual databases associated with the user IDs; and mapping, by the computer processor, the user IDs with the workspaces, profiles for the commerce server middleware software, data sources, and the virtual databases.

The present invention provides a computer program product, comprising a computer readable storage device storing a computer readable program code, the computer readable program code comprising an algorithm that when executed by a computer processor of a computer system implements a method, the method comprising: receiving, by the computer processor, software comprising an operating system, integrated development environment (IDE) software, and database software; provisioning, by the computer processor, a virtual image instance of the operating system, the IDE software, and the database software to a virtual instance; generating, by the computer processor, a plurality of user IDs for access to the operating system instance, wherein each user ID of the plurality of user IDs is associated with a different user of a plurality of users; installing, by the computer processor, commerce server middleware software as a user specific setup; configuring, by the computer processor, the IDE software, wherein the configuring the IDE software comprises generating workspaces and user ID permissions for the installing; associating, by the computer processor, the workspaces with the user IDs; configuring, by the computer processor, the commerce server middleware software, wherein the configuring the middleware software comprises mapping the user IDs, hosts, and ports to commerce server services associated with the commerce server middleware software; configuring, by the computer processor, the database software, wherein the configuring the database software comprises generating virtual databases associated with the user IDs; and mapping, by the computer processor, the user IDs with the workspaces, profiles for the commerce server middleware software, data sources, and the virtual databases.

The present invention provides a computer system comprising a computer processor coupled to a computer-readable memory unit, the memory unit comprising instructions that when executed by the computer processor implements a method comprising: receiving, by the computer processor, software comprising an operating system, integrated development environment (IDE) software, and database software; provisioning, by the computer processor, a virtual image instance of the operating system, the IDE software, and the database software to a virtual instance; generating, by the computer processor, a plurality of user IDs for access to the operating system instance, wherein each user ID of the plurality of user IDs is associated with a different user of a plurality of users; installing, by the computer processor, commerce server middleware software as a user specific setup; configuring, by the computer processor, the IDE software, wherein the configuring the IDE software comprises generating workspaces and user ID permissions for the installing; associating, by the computer processor, the workspaces with the user IDs; configuring, by the computer processor, the commerce server middleware software, wherein the configuring the middleware software comprises mapping the user IDs, hosts, and ports to commerce server services associated with the commerce server middleware software; configuring, by the computer processor, the database software, wherein the configuring the database software comprises generating virtual databases associated with the user IDs; and mapping, by the computer processor, the user IDs with the workspaces, profiles for the commerce server middleware software, data sources, and the virtual databases.

The present invention provides a process for supporting computing infrastructure, the process comprising providing at least one support service for at least one of creating, integrating, hosting, maintaining, and deploying computer-readable code in a computer comprising a computer processor, wherein the computer processor carries out instructions contained in the code causing the computer processor to perform a method comprising the steps of: receiving, by the computer processor, software comprising an operating system, integrated development environment (IDE) software, and database software; provisioning, by the computer processor, a virtual image instance of the operating system, the IDE software, and the database software to a virtual instance; generating, by the computer processor, a plurality of user IDs for access to the operating system instance, wherein each user ID of the plurality of user IDs is associated with a different user of a plurality of users; installing, by the computer processor, commerce server middleware software as a user specific setup; configuring, by the computer processor, the IDE software, wherein the configuring the IDE software comprises generating workspaces and user ID permissions for the installing; associating, by the computer processor, the workspaces with the user IDs; configuring, by the computer processor, the commerce server middleware software, wherein the configuring the middleware software comprises mapping the user IDs, hosts, and ports to commerce server services associated with the commerce server middleware software; configuring, by the computer processor, the database software, wherein the configuring the database software comprises generating virtual databases associated with the user IDs; and mapping, by the computer processor, the user IDs with the workspaces, profiles for the commerce server middleware software, data sources, and the virtual databases.

The present invention advantageously provides a simple method and associated system capable of managing multiple users of a system.

DETAILED DESCRIPTION

Figure 1:
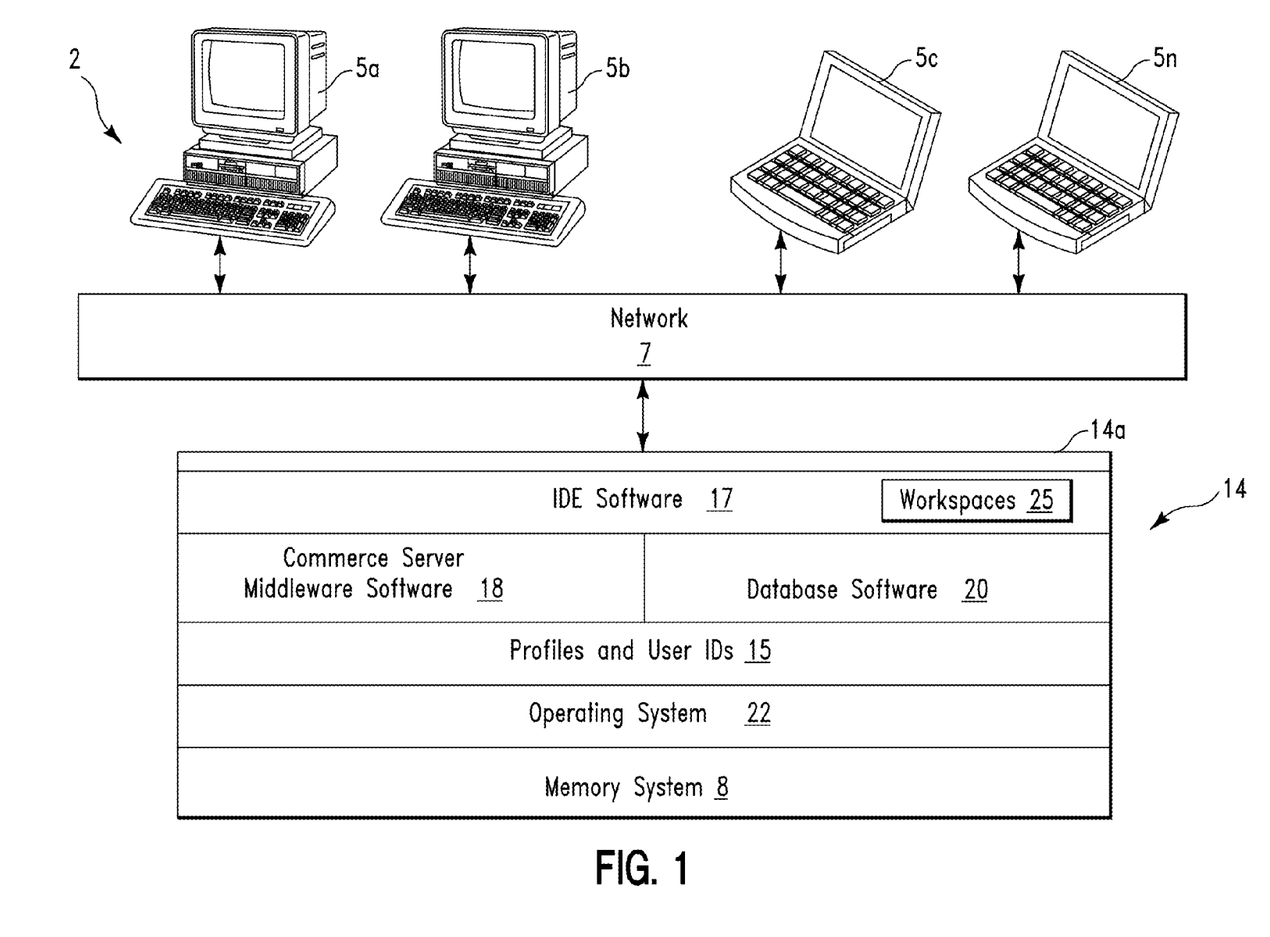
FIG. 1 illustrates a system for enabling multi-tenancy using commerce server middleware software, in accordance with embodiments of the present invention.

FIG. 1 illustrates a system 2 for enabling multi-tenancy using commerce server middleware software 18, in accordance with embodiments of the present invention. Multi-tenancy is defined herein as a software architecture that includes a single instance of software running on a server and serving multiple client organizations (i.e., tenants). In a multi-tenant environment, multiple customers share a same application running on a same operating system, hardware, and data-storage mechanism.

System 2 of FIG. 1 comprises computer terminals 5a . . . 5n through a network 7 to a computing system 14. Network 7 may comprise any type of network including, inter alia, a local area network, (LAN), a wide area network (WAN), the Internet, a wireless network, etc. Computing system 14 and computer terminals 5a . . . 5n may comprise any type of computing system(s) including, inter alia, a computer (PC), a laptop computer, a server, a PDA, etc. Computing system 14 comprises a virtual instance 14a comprising a memory system 8, integrated development environment (IDE) software 17 comprising work spaces 25, database software 20, commerce server middleware software 18, operating systems 22, and user IDs and profiles 15.

Virtual instance 14a enables multiple customers to share a same application running on a same operating system and hardware with a same data-storage mechanism. System 2 enables multi-tenancy in a developer/test/training environment using IDE software 17 in combination with commerce server middleware software 18. Commerce server middleware software 18 may include, inter alia, application servers and business process management servers that support a creation of multiple server instances on a same installation. The server instances may be created as profiles (e.g., profiles 15) with different configurations, features, and deployment characteristics. Each profile or server instance acts as a standalone server and supports an installation of applications as described in the following examples:

EXAMPLE 1

An application server supports multiple profiles to be created. Each profile comprises a server instance. The application server supports profiles to be created on multiple nodes and therefore a central deployment manager profile may support multiple stand-alone server profiles on multiple nodes.

EXAMPLE 2

A process server supports multiple profiles to be created. Each profile comprises a process server instance. The profiles may be augmented as enterprise service bus profiles thereby enabling the use of process server profiles or enterprise service bus profiles as business process management servers, standalone server profiles, and/or on multiple nodes.

System 2 allows databases (i.e., using database software 20) to be created, provisioned, and associated with each application server profile. The databases are created through logical partitioning (i.e., table spaces or schemas with appropriate permissions for specific users or user groups) or physical partitioning (i.e., separate databases with appropriate permissions for specific users or user groups). System 2 enables the following process for enabling multi-tenancy using commerce server middleware software 18:

1. An image instance is provisioned with an operating system (e.g., of operating systems 22) in a virtual environment. The operating system is associated with system requirements for commerce server middleware software 18.
2. IDE software 17 is installed such that it may be accessed by multiple users. IDE software 17 may include any features associated with commerce server middleware software 18.
3. Commerce server middleware software 18 is installed on the same image instance or different image instances in the virtual environment. Commerce server middleware software 18 may be installed as an independent installation or as a test environment configuration associated with IDE software 17.
4. Database software 20 is installed on the same image instance or different image instances in the virtual environment.
5. User IDs (associated with multiple users) and associated privileges are generated for the operating system. NU users comprising associated user IDs and associated privileges are generated. NU=a number of users 1 . . . N (e.g., user1, user2 . . . user10 . . . userN). The user IDs are associated with privileged users or a power users group (e.g., an administrators group) and a remote users group (e.g., remote users) on an operating system. Image instance(s) may be enabled for multiple logins by applying an appropriate license within a virtual environment, thereby allowing multiple users to login to associated IDE software 17.

Commerce server middleware software 18 is configured (for each user ID or tenantID/userID combination) for multi-tenancy as follows:

1. A login process using a user ID is enabled.
2. Commerce server middleware software 18 is installed as a user-specific installation within the IDE software 17 or configured for a specific type of IDE software 17.
3. IDE software 17 is configured for a user by generating workspaces, shortcuts or links, user-specific permissions, privileges, and security settings for IDE software 17.

4. IDE workspaces are configured such that only the specified user IDs may have access privileges.
5. For each commerce server middleware software 18 node and host combination used by a user ID, a mapping process (e.g., user ID, host, and port) for all ports used by a user ID for appropriate commerce server middleware software 18 services is initiated.
6. A server index.xml file (comprising named end points for each commerce server middleware software 18 port configured for a user ID) is updated.
7. A virtual hosts.xml file (i.e., to add/update an appropriate multi-purpose Internet mail extension (MIME) Entry with host Aliases, host Names, and ports used by the user ID) is updated.
8. A commerce-server.xml file (for appropriate commerce server middleware software 18 port numbers under a <webserver> . . . </webserver> node of the file) is updated.
9. Additional applicable configuration files are updated.
10. Data sources (databases, schemas/tablespaces, etc.) are associated/mapped and assigned permissions for access to the data sources so that only specific user IDs may access data.

The aforementioned process allows specific user (via a user ID) to login to a virtual commerce server environment such that they may access their own commerce server developer stack.

Figure 2:
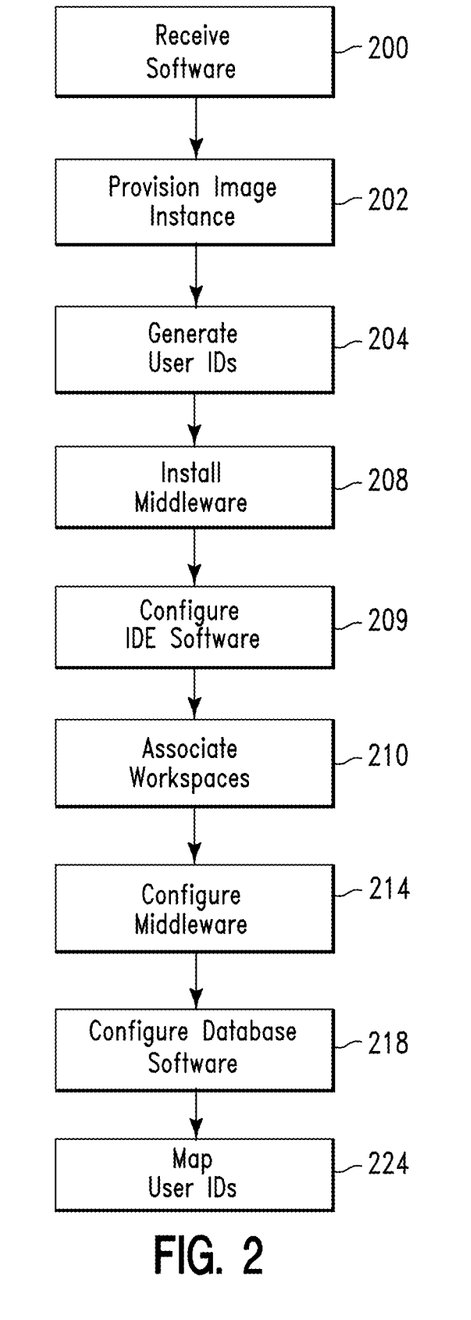
FIG. 2 illustrates an algorithm detailing a process flow enabled by the system of FIG. 1 for enabling multi-tenancy using commerce server middleware software, in accordance with embodiments of the present invention.

FIG. 2 illustrates an algorithm detailing a process flow enabled by system 2 of FIG. 1 for enabling multi-tenancy using commerce server middleware software 18, in accordance with embodiments of the present invention. In step 200, a computing system comprising a computer processor (e.g., computing system 14 comprising virtual instance 14a in FIG. 1) receives operating system software, IDE software, and database software. In step 202, the computer processor provisions a virtual image instance of the operating system software, the IDE software, and the database software to a virtual instance. In step 204, the computer processor generates user IDs for access to the operating system instance. In step 208, the computer processor installs commerce server middleware software as a user specific setup. In step 209, the computer processor configures the IDE software. The IDE software configuration process includes:
1. Generating workspaces.
2. Mapping the user IDs to the workspaces such that each user ID is associated with at least one workspace.
3. Configuring permissions associated with accessing the workspaces.

In step 210, the computer processor associates the workspaces with the user IDs. In step 214, the computer processor configures the commerce server middleware software. The commerce server middleware software configuration process includes:
1. Mapping the user IDs, hosts, and ports to commerce server services associated with the commerce server middleware software.
2. Updating a server index xml file with end points for the ports configured for the user IDs.
3. Updating a virtual host xml file to add or update an associated entry with host aliases, names, and ports used by said user IDs.
4. Updating a commerce server xml file with an associated port.

In step 218, the computer processor configures the database software. The database software configuration process includes:

1. Generating virtual databases associated with the user IDs.
2. Mapping the user IDs to the virtual databases through the user specific permissions.
3. Generating data sources associated with the virtual databases.
4. Assigning the user specific permissions to the data sources.
5. Mapping the virtual databases to the middleware profiles through the data sources.

In step 224, the computer processor maps the user IDs to the workspaces, profiles for the commerce server middleware software, data sources, and the virtual databases.

Figure 3A:
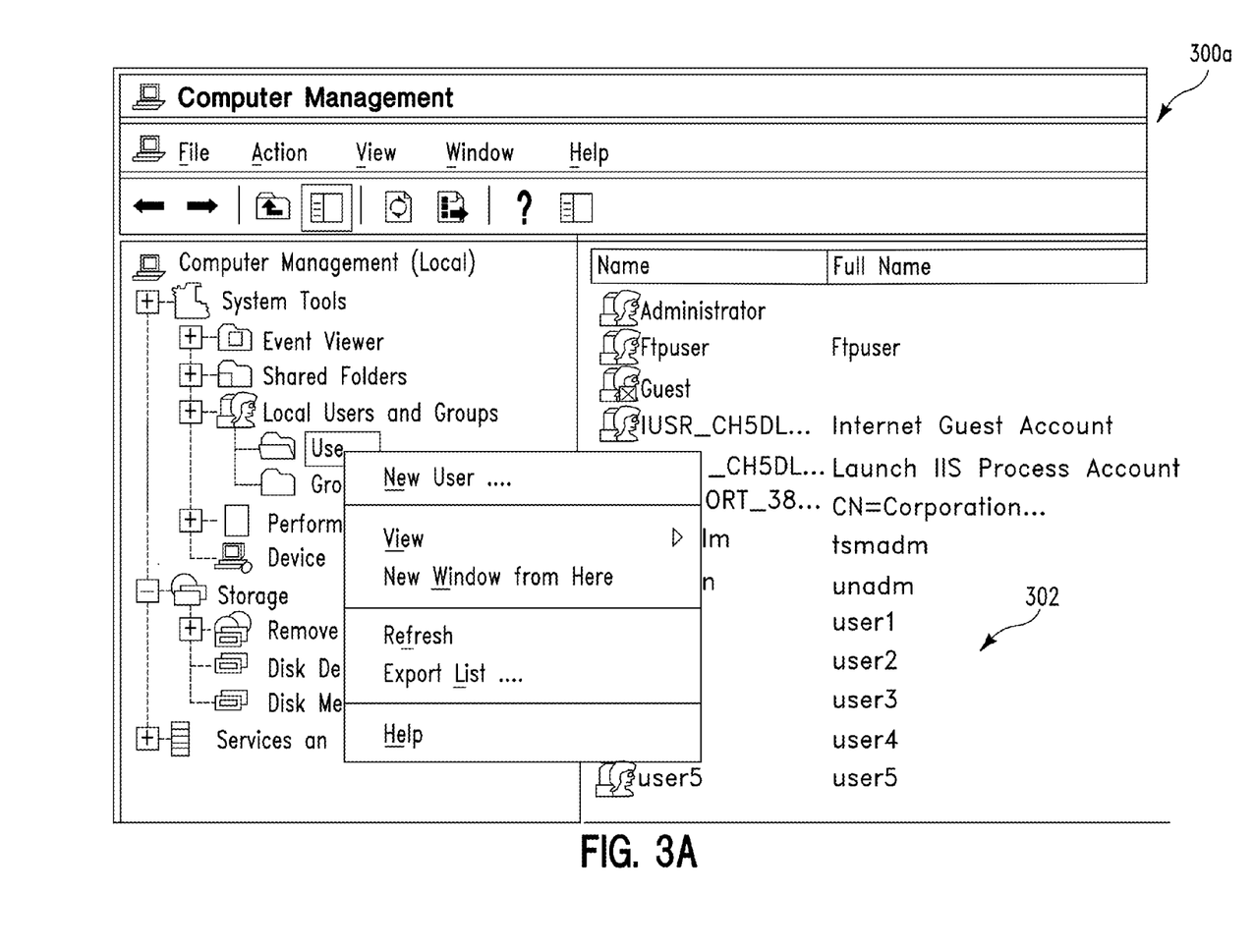
FIGS. 3A-3B illustrate screen shot examples for implementing a process for enabling multi-tenancy using commerce server middleware software, in accordance with embodiments of the present invention.

FIG. 3A illustrates a screen shot 300a for generating user IDs 302 for users, in accordance with embodiments of the present invention.

Figure 3B:
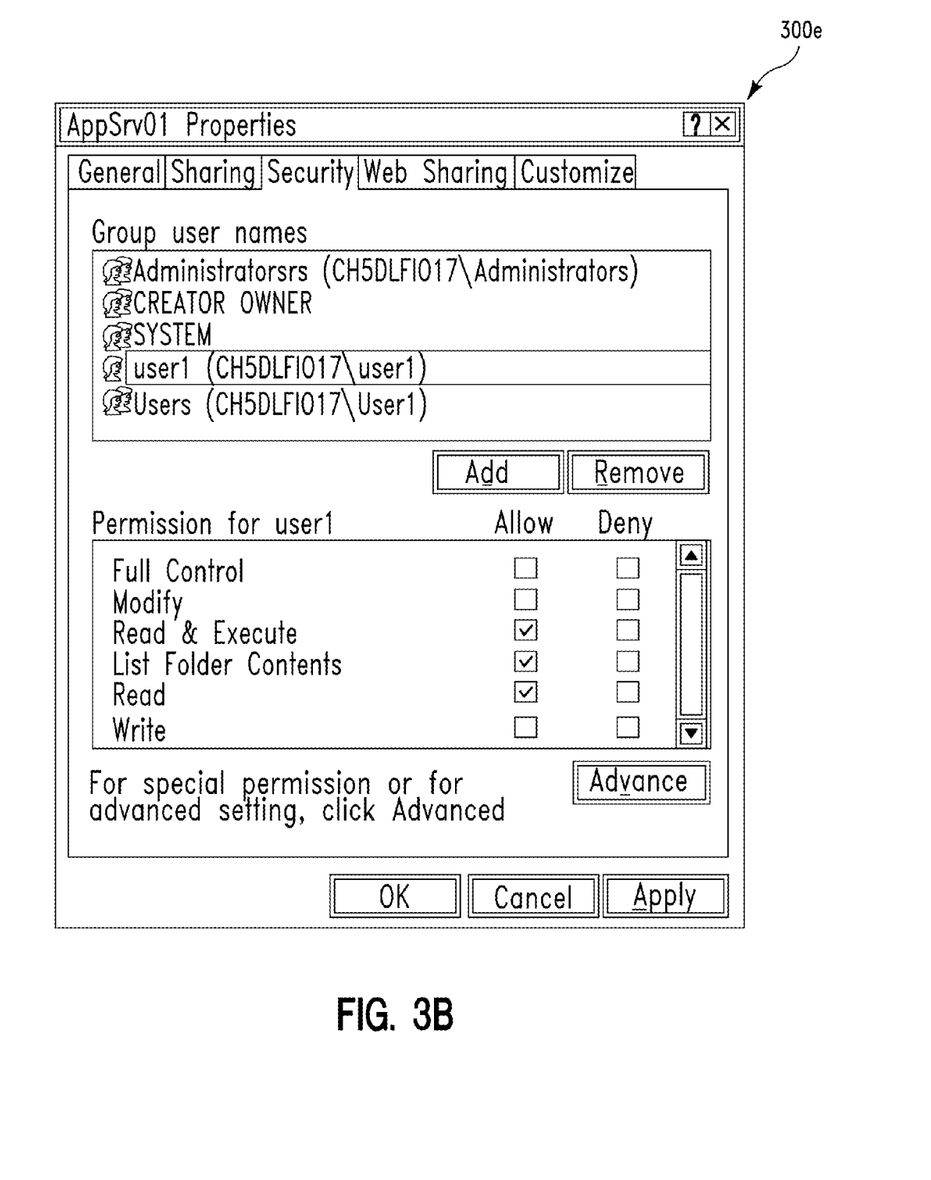

FIG. 3B illustrates a screen shot 300e for setting access rights for the user IDs associated with the respective middleware profiles, in accordance with embodiments of the present invention. Screenshot 300e illustrates the specific example of setting access permissions for the folder "AppSrv01" for the user ID "user1". Folder "AppSrv01" is associated with middleware profile AppSrv01.

Figure 4:
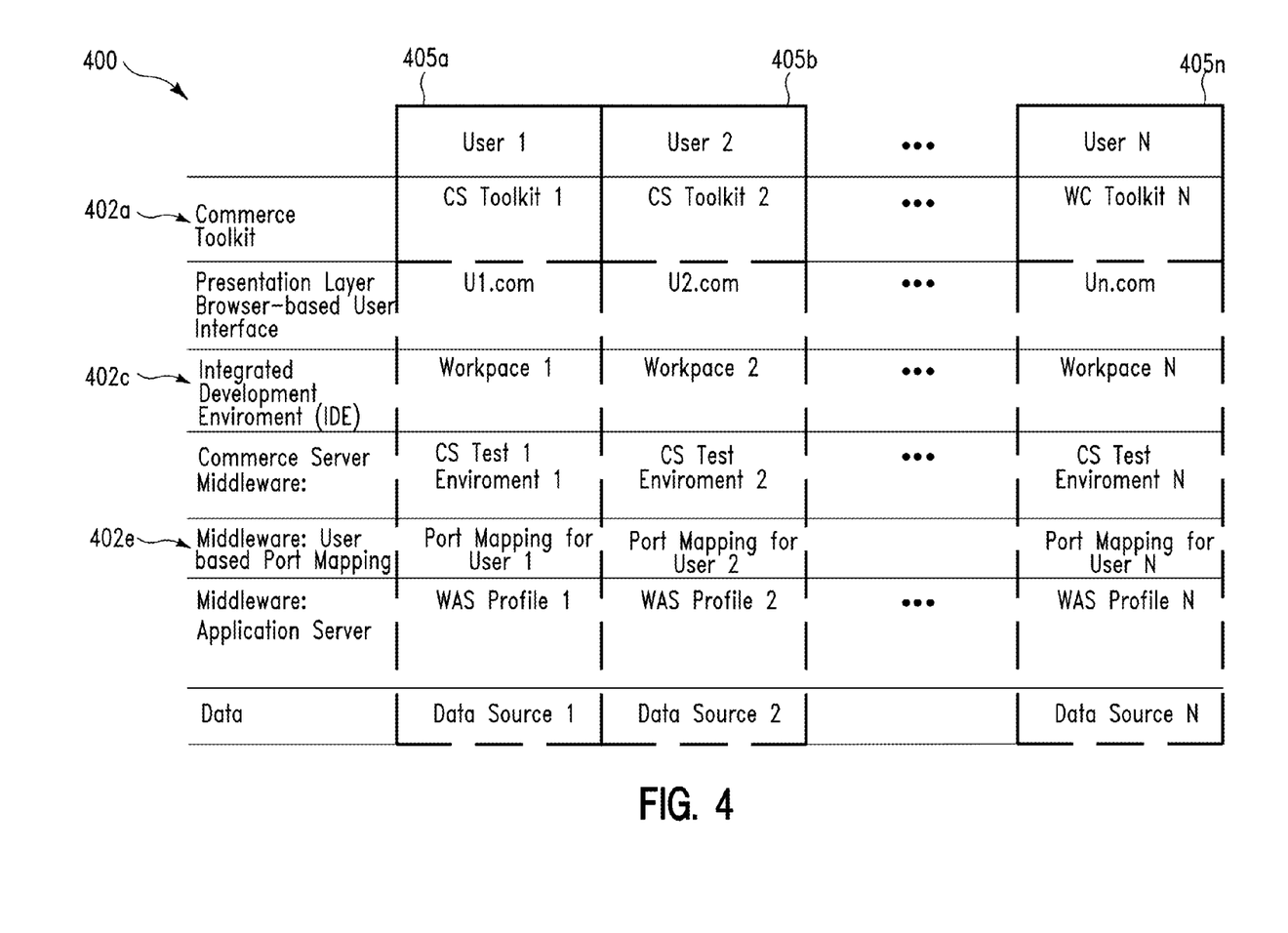
FIG. 4 illustrates a table depicting an overall virtual environment comprising installed commerce server middleware software, in accordance with embodiments of the present invention.

FIG. 4 illustrates a table depicting an overall virtual environment comprising installed commerce server middleware software, in accordance with embodiments of the present invention. Rows 402a, 402c, and 402e comprise steps for achieving a multi-tenant commerce server middleware software configuration. Users 405a . . . 405n (comprising user IDs) may be comprised by one or more tenants (e.g., a group of user IDs may map to a tenant ID, etc.).

Figure 5:
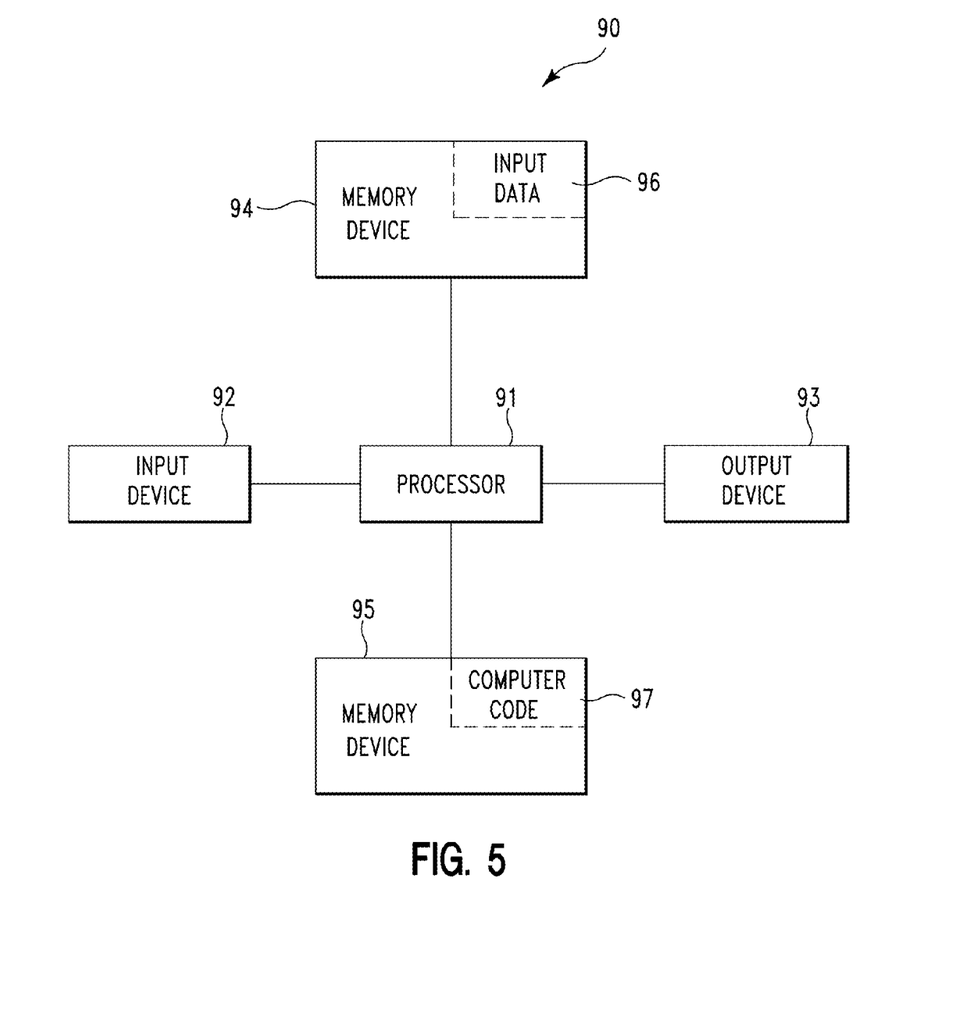
FIG. 5 illustrates a computer apparatus used by the system of FIG. 1 for enabling IDEs to become multi-tenant, in accordance with embodiments of the present invention.

FIG. 5 illustrates a computer apparatus 90 used by system 2 of FIG. 1 for enabling multi-tenancy using commerce server middleware software, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for enabling multi-tenancy using commerce server middleware software. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 5) may comprise the algorithm of FIG. 2 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise the computer usable medium (or said program storage device).

Still yet, any of the components of the present invention could be created, integrated, hosted, maintained, deployed, managed, serviced, etc. by a service supplier who offers to enable multi-tenancy using commerce server middleware software. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method enabling multi-tenancy using commerce server middleware software. In another embodiment, the invention provides a business method that performs the process steps of the invention on a subscription, advertising, and/or fee basis. That is, a service supplier, such as a Solution Integrator, could offer to enable multi-tenancy using commerce server middleware software. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A method comprising:
receiving, by a computing system comprising a computer processor, software comprising an operating system, integrated development environment (IDE) software, and database software;
provisioning, by said computer processor, a virtual image instance of said operating system, said IDE software, and said database software to a virtual instance;
generating, by said computer processor, a plurality of user identifications (IDS) for access to said operating system instance, wherein each user ID of said plurality of user IDs is associated with a different user of a plurality of users;
installing, by said computer processor, commerce server middleware software as a user specific setup;
configuring, by said computer processor, said IDE software, wherein said configuring said IDE software comprises generating workspaces, user ID permissions, shortcuts and links, user-specific permissions, privileges, and security settings for said IDE software for said installing;
associating, by said computer processor, said workspaces with said user IDs;
configuring, by said computer processor, said commerce server middleware software for multi-tenancy functionality, wherein said configuring said middleware software comprises:
configuring IDE workspaces such that only specified user IDs of said plurality of user IDs comprise access privileges;
mapping, for each commerce server middleware software node of said commerce server middleware software and host combination used by each said user ID, ports for associated commerce server middleware software services initiations;
updating a server index extensible markup language (xml) file comprising named end points for each commerce server middleware software port of said ports configured for each said user ID;
updating a virtual host xml file to add and update an associated multi-purpose Internet mail extension (MIME) entry with host aliases, host names, and associated ports used by each said user ID;
updating a commerce-server xml file for an associated commerce server middleware software port number under a webserver node of the commerce-server xml file; and
mapping data sources with assigned permissions for access to the data sources associated with only specific user IDs such that a specific user comprises an authorization to login to a virtual commerce server environment such that the specific user is able to access an associated commerce server developer stack;
configuring, by said computer processor, said database software, wherein said configuring said database software comprises generating virtual databases associated with said user IDs; and
mapping, by said computer processor, said user IDs with said workspaces, profiles for said commerce server middleware software, data sources, and said virtual databases.

2. The method of claim 1, wherein said profiles for said commerce server middleware software comprise virtual server instances associated with said user IDs.

3. The method of claim 1, wherein said configuring said database software further comprises:
mapping said plurality of user IDs to said virtual databases through said user specific permissions;
generating data sources associated with said virtual databases;
assigning said user specific permissions to said data sources; and
mapping said virtual databases to said profiles through said data sources.

4. A computer program product, comprising a computer readable hardware storage device storing a computer readable program code, said computer readable program code comprising an algorithm that when executed by a computer processor of a computer system implements a method, said method comprising:
receiving, by said computer processor, software comprising an operating system, integrated development environment (IDE) software, and database software;
provisioning, by said computer processor, a virtual image instance of said operating system, said IDE software, and said database software to a virtual instance;
generating, by said computer processor, a plurality of user IDs for access to said operating system instance, wherein each user ID of said plurality of user IDs is associated with a different user of a plurality of users;
installing, by said computer processor, commerce server middleware software as a user specific setup;
configuring, by said computer processor, said IDE software, wherein said configuring said IDE software comprises generating workspaces, user ID permissions, shortcuts and links, user-specific permissions, privileges, and security settings for said IDE software for said installing;

associating, by said computer processor, said workspaces with said user IDs;

configuring, by said computer processor, said commerce server middleware software for multi-tenancy functionality, wherein said configuring said middleware software comprises:

configuring IDE workspaces such that only specified user IDs of said plurality of user IDs comprise access privileges;

mapping, for each commerce server middleware software node of said commerce server middleware software and host combination used by each said user ID, ports for associated commerce server middleware software services initiations;

updating a server index extensible markup language (xml) file comprising named end points for each commerce server middleware software port of said ports configured for each said user ID;

updating a virtual host xml file to add and update an associated multi-purpose Internet mail extension (MIME) entry with host aliases, host names, and associated ports used by each said user ID;

updating a commerce-server xml file for an associated commerce server middleware software port number under a webserver node of the commerce-server xml file; and     mapping data sources with assigned permissions for access to the data sources associated with only specific user IDs such that a specific user comprises an authorization to login to a virtual commerce server environment such that the specific user is able to access an associated commerce server developer stack;

configuring, by said computer processor, said database software, wherein said configuring said database software comprises generating virtual databases associated with said user IDs; and mapping, by said computer processor, said user IDs with said workspaces, profiles for said commerce server middleware software, data sources, and said virtual databases.

5. The computer program product of claim 4, wherein said profiles for said commerce server middleware software comprise virtual server instances associated with said user IDs.

6. The computer program product of claim 4, wherein said configuring said database software further comprises:

mapping said plurality of user IDs to said virtual databases through said user specific permissions;

generating data sources associated with said virtual databases;

assigning said user specific permissions to said data sources; and mapping said virtual databases to said profiles through said data sources.

7. A computer system comprising a computer processor coupled to a computer-readable memory unit, said memory unit comprising instructions that when executed by the computer processor implements a method comprising:

receiving, by said computer processor, software comprising an operating system, integrated development environment (IDE) software, and database software;

provisioning, by said computer processor, a virtual image instance of said operating system, said IDE software, and said database software to a virtual instance;

generating, by said computer processor, a plurality of user IDs for access to said operating system instance, wherein each user ID of said plurality of user IDs is associated with a different user of a plurality of users;

installing, by said computer processor, commerce server middleware software as a user specific setup;

configuring, by said computer processor, said IDE software, wherein said configuring said IDE software comprises generating workspaces, user ID permissions, shortcuts and links, user-specific permissions, privileges, and security settings for said IDE software for said installing;

associating, by said computer processor, said workspaces with said user IDs;

configuring, by said computer processor, said commerce server middleware software for multi-tenancy functionality, wherein said configuring said middleware software comprises:

configuring IDE workspaces such that only specified user IDs of said plurality of user IDs comprise access privileges;

mapping, for each commerce server middleware software node of said commerce server middleware software and host combination used by each said user ID, ports for associated commerce server middleware software services initiations;

updating a server index extensible markup language (xml) file comprising named end points for each commerce server middleware software port of said ports configured for each said user ID;

updating a virtual host xml file to add and update an associated multi-purpose Internet mail extension (MIME) entry with host aliases, host names, and associated ports used by each said user ID;

updating a commerce-server xml file for an associated commerce server middleware software port number under a webserver node of the commerce-server xml file; and     mapping data sources with assigned permissions for access to the data sources associated with only specific user IDs such that a specific user comprises an authorization to login to a virtual commerce server environment such that the specific user is able to access an associated commerce server developer stack;

configuring, by said computer processor, said database software, wherein said configuring said database software comprises generating virtual databases associated with said user IDs; and mapping, by said computer processor, said user IDs with said workspaces, profiles for said commerce server middleware software, data sources, and said virtual databases.

8. The computer system of claim 7, wherein said profiles for said commerce server middleware software comprise virtual server instances associated with said user IDs.

9. The computer system of claim 7, wherein said configuring said database software further comprises:

mapping said plurality of user IDs to said virtual databases through said user specific permissions;

generating data sources associated with said virtual databases;

assigning said user specific permissions to said data sources; and mapping said virtual databases to said profiles through said data sources.

10. A process for supporting computing infrastructure, the process comprising providing at least one support service for at least one of creating, integrating, hosting, maintaining, and deploying computer-readable code in a computer comprising a computer processor, wherein the computer processor carries out instructions contained in the code causing the computer processor to perform a method comprising the steps of:

receiving, by said computer processor, software comprising an operating system, integrated development environment (IDE) software, and database software;

provisioning, by said computer processor, a virtual image instance of said operating system, said IDE software, and said database software to a virtual instance;

generating, by said computer processor, a plurality of user IDs for access to said operating system instance, wherein each user ID of said plurality of user IDs is associated with a different user of a plurality of users;

installing, by said computer processor, commerce server middleware software as a user specific setup;

configuring, by said computer processor, said IDE software, wherein said configuring said IDE software comprises generating workspaces, user ID permissions, shortcuts and links, user-specific permissions, privileges, and security settings for said IDE software for said installing;

associating, by said computer processor, said workspaces with said user IDs;

configuring, by said computer processor, said commerce server middleware software for multi-tenancy functionality, wherein said configuring said middleware software comprises:

configuring IDE workspaces such that only specified user IDs of said plurality of user IDs comprise access privileges;

mapping, for each commerce server middleware software node of said commerce server middleware software and host combination used by each said user ID, ports for associated commerce server middleware software services initiations;

updating a server index extensible markup language (xml) file comprising named end points for each commerce server middleware software port of said ports configured for each said user ID;

updating a virtual host xml file to add and update an associated multi-purpose Internet mail extension (MIME) entry with host aliases, host names, and associated ports used by each said user ID;

updating a commerce-server xml file for an associated commerce server middleware software port number under a webserver node of the commerce-server xml file; and mapping data sources with assigned permissions for access to the data sources associated with only specific user IDs such that a specific user comprises an authorization to login to a virtual commerce server environment such that the specific user is able to access an associated commerce server developer stack;

configuring, by said computer processor, said database software, wherein said configuring said database software comprises generating virtual databases associated with said user IDs; and mapping, by said computer processor, said user IDs with said workspaces, profiles for said commerce server middleware software, data sources, and said virtual databases.

11. The process of claim 10, wherein said profiles for said commerce server middleware software comprise virtual server instances associated with said user IDs.

* * * * *